July 31, 1951
J. R. HOLLINS
2,562,272
VEHICLE SIGNAL LIGHT CIRCUIT
Filed April 20, 1948
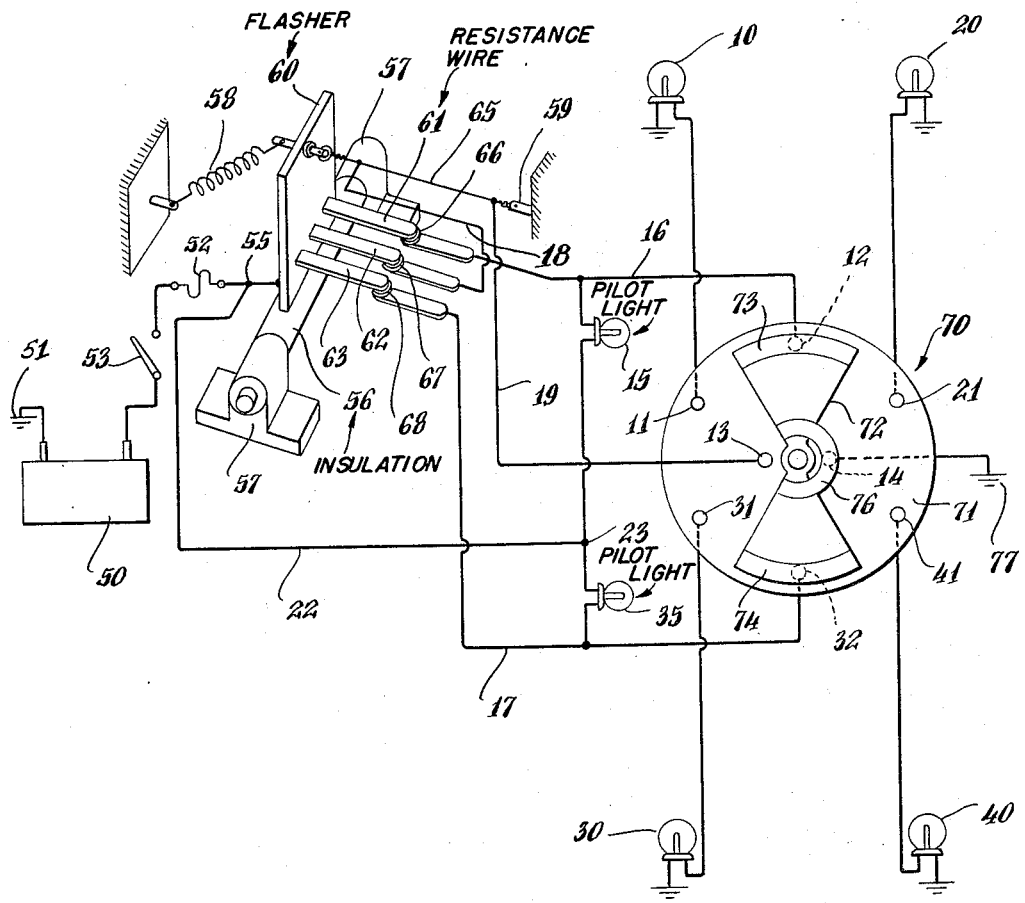
INVENTOR.
Jesse R. Hollins
BY
ATTORNEY.

Patented July 31, 1951

2,562,272

UNITED STATES PATENT OFFICE 2,562,272

VEHICLE SIGNAL LIGHT CIRCUIT

Jesse R. Hollins, Brooklyn, N. Y.

Application April 20, 1948, Serial No. 22,070

4 Claims. (Cl. 177—339)

This invention relates to lighting circuits including pilot or indicator lamps and, more particularly, to such a circuit involving differential current flow over a pair of circuits.

The invention is particularly applicable to lighting circuits for vehicles, such as directional lamp circuits for automotive vehicles. Such circuits include a source of current and a direction-indication selector switch arranged to connect directional indicating lamps to the source. Pilot or indicator lamps are frequently mounted on the vehicle dashboard to act as tell-tales, and flashers are sometimes incorporated in the circuit to emphasize the indications.

In accordance with the present invention, pilot or indicating lamps are so connected to a directional lamp circuit as to intermittently flash off and on to act as tell-tales for the directional lamps. A directional switch is employed to selectively connect the directional lamps to a current source, such as an automotive storage battery.

Two current paths are provided between the source and the switch. One of these paths is a low resistance path including a flasher operated by a resistance wire. The other path is a high resistance path including the pilot or indicator lamps. The resistance wire is connected between a flasher contact and the switch.

The difference in resistance of the two paths is such that substantially all the current flows through the flasher to the switch, and only a small amount flows through the pilot lamp. With the flasher contacts closed, the current flow through the pilot lamps is insufficient to illuminate these lamps.

The flasher is spring-biased to open, and normally held closed by the resistance wire. The current flow through this wire heats it to increase its length. This allows the flasher to open, breaking the low resistance path to the switch. Current then flows to the switch through the pilot lamps until the resistance wire cools sufficiently to reclose the flasher. Failure of the pilot lamps to flash indicates an inoperative condition of the directional lamp circuit, apprising the vehicle operator of this fact.

It is therefore an object of this invention to provide a novel lighting circuit including intermittently illuminated circuit condition indicator or pilot lamp means.

Another object is to provide such a circuit including a pair of differing resistance current paths with means operative to effect intermittent alternation of the current flow between such paths.

A further object is to provide a novel directional lamp system for automotive vehicles.

These, and other objects, advantages and novel features of the invention will be apparent from the following description and the accompanying drawing. In the drawing, the single figure schematically indicates the application of the invention to a directional lamp arrangement for automotive vehicles.

Referring to the drawing, the invention is illustrated as incorporated in a vehicle signalling system, such a directional indicator arrangement for automotive vehicles.

As shown, directional lamps 10, 20, 30 and 40 are shown as selectively energizable, in pairs, from a current source 50 through a flasher 60 and a selector switch 70. A pilot or indicating lamp 15 is associated with signal lamps 10 and 20, and a pilot lamp 35 with signal lamps 30 and 40.

Source 50 may be an automotive type storage battery grounded at 51 and connected through a main control switch 53 (which may be the vehicle ignition switch) and a fuse 52 to the directional signal circuits at a junction point 55. From junction point 55, the current from source 50 to switch 70 divides to flow over two paths, one of which normally has a much higher resistance than the other. The normally lower resistance path includes the flasher 60, and the normally higher resistance path the pilot or indicator lamps 15 and 35.

The flasher element is preferably of the snap action type and as schematically illustrated in perspective on the left of the drawing, comprises a metallic plate 60, having integral therewith the respective ends of switch blades 61, 62 and 63, said switch blades being in spaced parallel alignment and having sufficient rigidity to move with plate 60 as it is displaced. Flasher plate 60 is mounted in an insulation support 56, the ends of which are in the form of stub shafts rockable in supports 57. Plate 60 is in electrical connection with junction point 55.

Arms 61, 62, 63 normally engage contacts 66, 67, 68, respectively. Insulating supports 56 is indicated as pivotally mounted on a support 57, and a tension spring 58 normally biases plate 60 to swing counter-clockwise to disengage the contact arms 61, 62, 63 from contacts 66, 67, 68. Such counter-clockwise movement normally is restrained, and the contact arms maintained engaged, by a resistance wire 65 insulatingly mounted for non-conductive connection between plate 60 and a fixed point 59. Wire 65 may be any suitable resistance wire, but is preferably a "Nichrome" wire. When the wire lengthens, due to heating by current flow therethrough, spring 58 swings plate 60 to open the flasher.

The selective switch 70 comprises an insulating base 71 and an oscillatable double-sector shaped arm 72 pivoted on the base. Base 71 has an outer row of contacts 11, 12, 21, 31, 32 and 41, and inner diametrically aligned contacts 13, 14. Contacts 11, 21, 31 and 41 are connected, respectively, to one terminal of lamps 10, 20, 30 and 40, and the other terminals of those lamps are grounded. A conductor 16 connects contact 12 to flasher contact 66, and a conductor 17 connects contact 32 to flasher contact 68. Flasher contact 67 is connected by a conductor 18 to one end of resistance wire 65, and a conductor 19 connects the other end of the resistance wire to switch contact 13.

Sector arm 72 carries, at either outer end, arcuate conductor strips 73 and 74. Near its center, arm 72 carries an incompletely annular conductor strip 76. Strip 73 is arranged, upon operation of switch 70, to electrically connect contact 12 to either contact 11 or contact 21. Similarly, strip 74 selectively connects contact 32 to either of the contacts 31 or 41. Strip 76 continuously engages contact 14, which is grounded at 77, and electrically connects contact 14 to contact 13 whenever switch 70 is operated. It will be noted that a conductor 22 connects junction point 55 to junction point 23. This latter point is connected to one terminal of each pilot or indicator lamp 15, 35, and the other terminals of these lamps are connected, either directly or through conductors 16 or 17, to contacts 12 and 32, respectively.

The operation of the system is as follows: Assuming that switch 53 is closed and switch 70 has been operated to swing arm 72 counter-clockwise, current will flow from source 50 to junction point 55. Strip 73 will connect contacts 11 and 12, strip 74 contacts 41 and 32 and strip 76 contacts 13 and 14.

At junction point 55, there are two paths for current to flow through switch 70 and lamps 10 and 40 to ground. The first path includes flasher 60, particularly arms 61, 63, contacts 66, 68 and conductors 16, 17 and thence to lamps 10 and 40. Also included in the first path are arm 62, contact 67, conductor 18, resistance wire 65, conductor 19, contacts 13, 14 and strip 76. Because of its several branches, this first path between junction point 55 and switch contacts 12, 13 and 32 is a relatively low resistance path.

The second path between point 55 and switch 70 includes conductor 22, junction point 23 and the relatively high resistance pilot or indicator lamps 15, 35. Due to the high resistance of this second path as compared to the low resistance of the first path, substantially all of the current flows to switch 70 through flasher 60, and the current flow through pilot lamps 15, 35 is insufficient to illuminate these lamps.

The current thus flows through flasher 60, conductors 16, 17 and switch 70 to illuminate lamps 10 and 40. At the same time, current flows through flasher arm 62, contact 67, conductor 18, resistance wire 65, conductor 19, contact 13, strip 76 and contact 14 to ground 77. The current through resistance wire 65 heats the latter, causing it to lengthen. This allows spring 58 to swing support 56 counter-clockwise, eventually disengaging contact arms 61, 62, 63 from contacts 66, 67, 68, respectively. In practice, such disengagement would be a snap action effect.

This disengagement breaks or opens the first, or low resistance current path, between point 55 and switch 70. Consequently, all the current now flows over the second path including pilot lamps 15 and 35, illuminating the latter. After a short time interval, wire 65 cools sufficiently to re-close flasher 60, extinguishing pilot lamps 15 and 35. Should either pilot lamp 15 or 35 fail to light when flasher 60 opens, it indicates circuit trouble for either pair of directional lamps 10, 20 or 30, 40. Thus, the intermittent flashing of pilot lamps 15, 35, which may be mounted on the vehicle dashboard, indicates an operative condition of the directional lamp circuits. The same effect takes place when sector arm 72 is swung clockwise to energize lamps 20 and 30.

Although flasher plate 60 has been illustrated in the drawing as being a metallic conductor, it is within the province of this invention to provide a rockable insulator block as a mounting for horizontally spaced and aligned switch blades 61, 62 and 63 with each such blade being electrically connected at their points of mounting to junction 55; the wire 65 being connected directly to the insulator block at its upper extremity; the insulating block being mounted for pivotal movement on a support and biased by a tension spring 58.

The described circuit arrangement provides a novel lighting system operating on current differentials to flash pilot or indicator lamps to advise the vehicle operator of the operative or inoperative condition of the directional light circuits. The arrangement is simple and compact, and involves only a change in the wiring between the usual components of such system, plus the addition of a relatively few circuit components.

While a specific embodiment of the invention has been shown and described in detail to illustrate the principles thereof, it will be understood that the invention may be otherwise embodied without departing from such principles.

What is claimed is:

1. A vehicle signal light circuit comprising, in combination, a source of electric current; signal lamps energizable from said source; a switch selectively operable to control the energization of said signal lamps; a high resistance current path and a low resistance current path extending in parallel between said source and said switch; said high resistance path being in continuous circuit connection between said source and said switch and including indicator lamps for and in series with said signal lamps, and substantially all the current for said signal lamps flowing through said low resistance path upon closure of said switch; a normally closed circuit breaker in said low resistance path; and means in said low resistance circuit operable periodically to open said circuit breaker, whereby all the current will flow through the high resistance path to energize said indicator lamps.

2. A vehicle signal light circuit comprising, in combination, a source of electric current; signal lamps energizable from said source; a switch selectively operable to control the energization of said signal lamps; a high resistance current path and a low resistance current path extending in parallel between said source and said switch; said high resistance path being in continuous circuit connection between said source and said switch and including indicator lamps for and in series with said signal lamps, and substantially all the current for said signal lamps flowing through said low resistance path upon closure of said switch; a normally closed circuit breaker in said low resistance path; current flow responsive means in said low resistance circuit operable periodically to open said circuit breaker, whereby all the current will flow through the high resistance path to energize said indicator lamps.

3. A vehicle signal light circuit comprising, in combination, a source of electric current; signal lamps energizable from said source; a switch selectively operable to control the energization of said signal lamps; a high resistance current path and a low resistance current path extending in parallel between said source and said switch; said high resistance path being in continuous circuit connection between said source and said switch and including indicator lamps for and in series with said signal lamps, and substantially all the current for said signal lamps flowing through said low resistance path upon closure of said switch; a normally closed circuit breaker in said low resistance path; and current flow responsive means operable periodically to open said circuit breaker, whereby all the current will flow through the high resistance path to energize said indicator lamps; said circuit breaker controlling the current flow through said responsive means.

4. A vehicle signal light circuit comprising, in combination, a source of electric current; signal lamps energizable from said source; a switch selectively operable to control the energization of said signal lamps; a high resistance current path and a low resistance current path extending in parallel between said source and said switch; said high resistance path being in continuous circuit connection between said source and said switch and including indicator lamps for and in series with said signal lamps, and substantially all the current for said signal lamps flowing through said low resistance path upon closure of said switch; a circuit breaker in said low resistance path; means biasing said circuit breaker to open; a resistance wire normally restraining opening of said circuit breaker; and circuit means connecting said wire in series between said circuit breaker and said switch, said resistance wire expanding, when heated by current flow therethrough, to provide for said biasing means to open said circuit breaker whereby all the current will flow through the high resistance path to energize said indicator lamps; said wire contracting upon cooling, to re-close said circuit breaker.

JESSE R. HOLLINS.

REFERENCES CITED

The following references are of record in the file of this patent:

UNITED STATES PATENTS

| Number | Name | Date |
|---|---|---|
| 2,141,210 | Foulks | Dec. 27, 1938 |
| 2,321,803 | Folge et al. | June 15, 1943 |
| 2,358,332 | Kennett | Sept. 19, 1944 |